United States Patent [19]

Azuma et al.

[11] 4,366,897

[45] Jan. 4, 1983

[54] SPEED DROP DETECTOR FOR HIGH-SPEED BUCKET BELT CONVEYOR

[75] Inventors: Hiroaki Azuma; Hideo Kato; Akira Oyama, all of Osaka, Japan

[73] Assignee: Tsubakimoto Chain Co., Osaka, Japan

[21] Appl. No.: 198,561

[22] Filed: Oct. 20, 1980

[30] Foreign Application Priority Data

Oct. 31, 1979 [JP] Japan ............................. 54-139814

[51] Int. Cl.³ .............................................. B65G 43/04
[52] U.S. Cl. .................................... 198/502; 198/856; 361/238; 361/242
[58] Field of Search ............... 361/236, 238, 239, 242; 318/311, 312; 73/514, 517 R; 324/161, 173, 174; 340/669, 670; 198/502, 856

[56] References Cited

U.S. PATENT DOCUMENTS 3,746,986 7/1973 Ciemochowski ............... 340/669 X
3,989,989 11/1976 Mayer ............................. 361/242 X
4,119,055 10/1978 Ward et al. ...................... 198/502 X Primary Examiner—Reinhard J. Eisenzopf
Attorney, Agent, or Firm—Blanchard, Flynn, Thiel, Boutell & Tanis

[57] ABSTRACT

A multi-application speed drop detector, for a high-speed bucket belt conveyor conveying powdery substances, that can automatically perform such functions as alarming, causing ordinary and emergency stops in accordance with the amount of speed drop of the belt conveyor from a set speed level, and eliminating the effect of an increased bucket pitch at a joint in the belt. A bucket passage detection signal produced by an electromagnetic induction sensor is used in order to avoid the ignition and explosion of the powdery substance being conveyed due to a slip of the belt.

2 Claims, 5 Drawing Figures

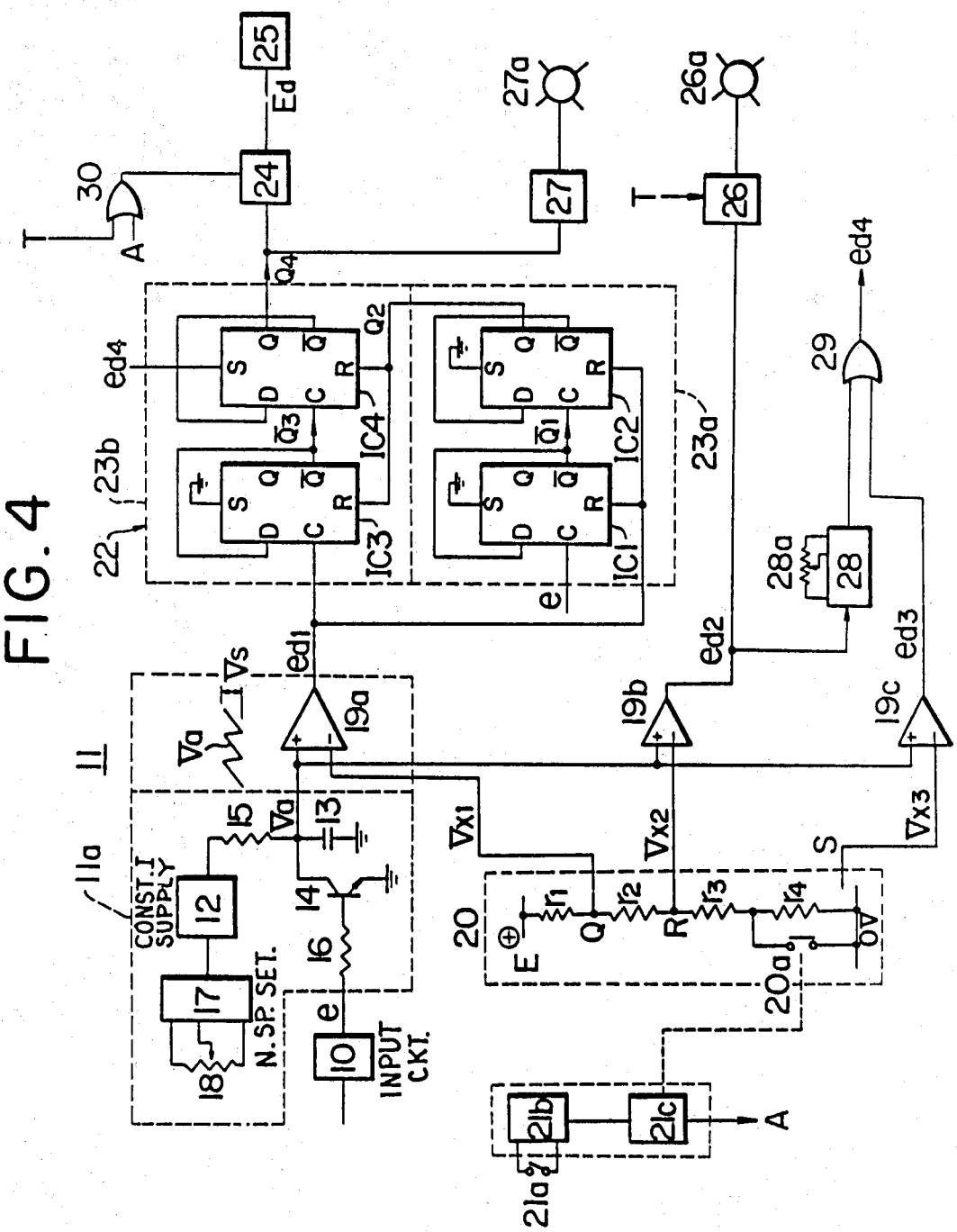

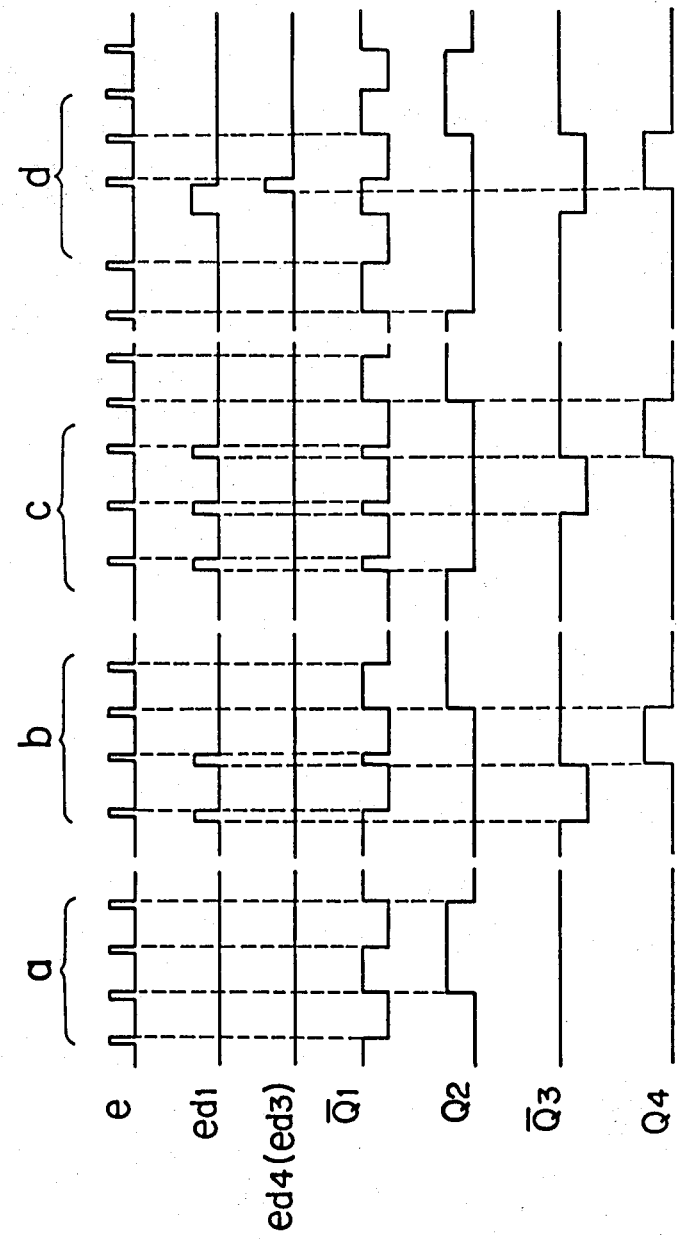

SPEED DROP DETECTOR FOR HIGH-SPEED BUCKET BELT CONVEYOR

FIELD OF THE INVENTION

This invention relates to a speed drop detector for a high-speed bucket belt conveyor for use in the transportation of grains, chemical materials, and other powdery or granular matter. More particularly, the invention relates to a speed drop detector for detecting a drop in the travel speed of the bucket belt conveyor to a predetermined rate, and giving an alarm in accordance with the speed drop rate or bringing the conveyor to an ordinary or emergency stop.

BACKGROUND OF THE INVENTION

A high-speed bucket belt conveyor usually comprises a number of metal buckets attached at intervals of approximately 160 mm. to an endless belt, by fixing bolts passed therethrough. Conventionally, the belt moves vertically at a speed of between approximately 200 and 300 m. per minute. Therefore, a slip of the belt, due to overloading or for other reasons, causes great friction between the bucket fastening bolt and a belt driving wheel, which can produce a spark that may set afire the dust arising from the grain, etc., being conveyed and thereby cause a dust explosion.

To prevent disasters of this kind, measures have been taken to determine the belt speed by detecting the passage of a bucket with a contactless switch and, thereby, detect the belt slip.

With the buckets usually spaced very closely, however, oscillating and magnetic contactless switches are not suited for such bucket detection. Meanwhile, small contactless switches featuring a high detection speed must be installed as close as possible to the object to be detected because of their generally limited detecting distance. But, in actuality, extensive swinging of the belt does not permit such maximal close installation. Large contactless switches, on the other hand, have great enough detecting distance to stand well clear of the swinging belt. But they are so sensitive that they detect the next bucket before the detection of a preceding bucket has been completed.

An object of this invention is to provide a speed drop detector for a high-speed bucket belt conveyor that is capable of surely detecting rapidly moving, closely spaced buckets, setting a speed drop rate with high accuracy irrespective of the bucket speed, and working in conformity with various speed drop rates.

Another object of this invention is to provide a speed drop detector for a high-speed bucket belt conveyor that is capable of surely detecting a speed drop even if buckets are spaced farther away from each other where belt ends are joined together than in other parts of the belt.

Still another object of this invention is to provide a speed drop detector for a high-speed bucket belt conveyor that is versatile and can be used in accordance with the operating conditions of the belt conveyor.

BRIEF DESCRIPTION OF THE DRAWINGS

The accompanying drawings illustrate an embodiment of this invention, in which:

FIG. 4 is a detailed circuit diagram.

FIG. 5 shows signal waves at different parts of FIG. 4.

Now a preferred embodiment of this invention will be described by reference to the accompanying drawings.

Figure 1:
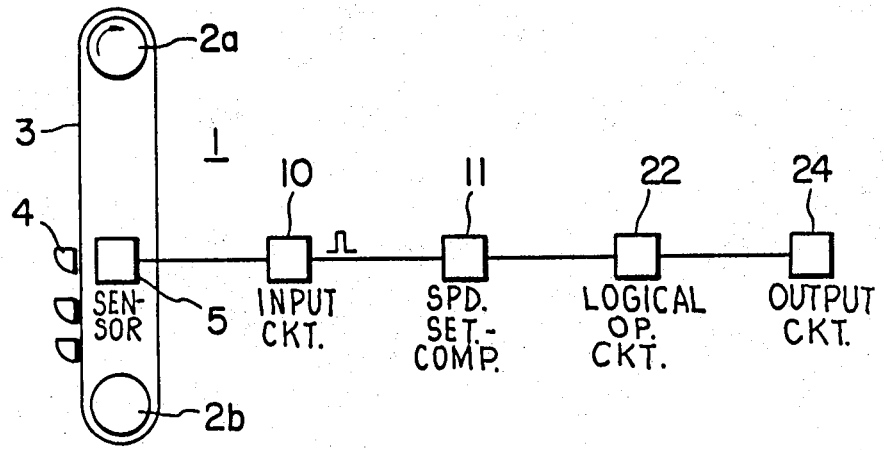
FIG. 1 is a sketch illustrating the general arrangement of a high-speed bucket belt conveyor system.

In FIG. 1, a high-speed bucket belt conveyor 1 comprises an endless belt 3 passed over a top and a bottom roller 2a and 2b rotatably supported in a suitable frame, not shown. A number of buckets 4 are attached to said belt at short regular intervals, with the roller 2a rotated at high speed by driving means, not shown, in the direction of the arrow, thereby conveying grain, etc. contained in the buckets 4.

Figure 2:
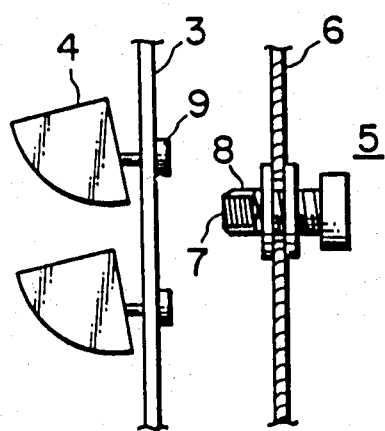
FIG. 2 is an enlarged side elevation showing part of a sensor in cross section.

An electromagnetic induction sensor 5 for detecting a passing bucket is provided opposite to the rear side of the ascending belt 3. As shown in FIG. 2, the sensor 5 comprises a permanent magnet bar 7 fastened to a fixing member 6 and wound with a coil 8. When a bolt 9 of ferromagnetic material (such as steel), which fastens the bucket 4 to the belt 3, passes in front of the permanent magnet 7, a resulting change in the magnetic flux of the permanent magnet 7 induces a pulsed voltage in the coil 8. The pulsed voltage is amplified and inputted in an input circuit 10.

Figure 3:
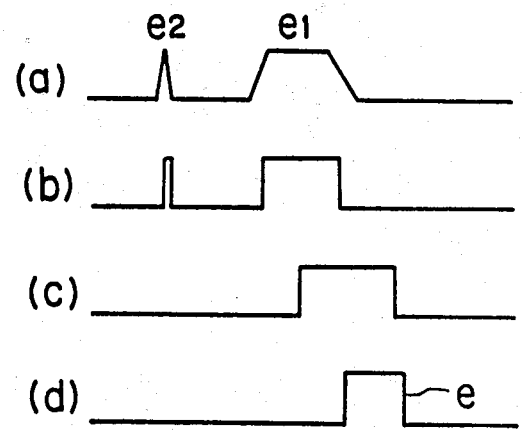
FIG. 3 is a representation of signal waves showing the operation of an input circuit.

As shown at (a) of FIG. 3, a bucket passage signal e1 is sometimes accompanied by a noise e2. Waveform shaping in the input circuit 10, as shown at (b), and combination with a delay signal, as shown at (c), yields a single-shot signal e shown at (d), thereby eliminating the noise e2 which is shorter than the delay time. The single-shot signal e is inputted to a speed setter-comparator 11 as a bucket detection signal.

As shown in FIG. 4, the speed setter-comparator 11 includes a speed setter 11a and a comparator 19a. The speed setter 11a comprises a constant current supply 12, a capacitor 13, an N-P-N transistor 14, and resistors 15 and 16. A constant current from the constant current supply 12 linearly increases capacitor charging voltage Va. However, the capacitor voltage Va reduces to zero when the transistor 14 conducts and the capacitor 13 discharges, as a result of the inputting of the signal e. Accordingly, the voltage Va changes in a sawtooth-like manner. A drop in the belt speed extends the input cycle of the signal e and the capacitor charging time, whereby the maximum value Vs of the voltage Va increases in inverse proportion to the belt speed.

A normal speed setter 17 sets the output current from the constant current supply 12 by means of a variable setting resistor 18. This in turn sets the charging rate of the capacitor 13, and thus the gradient of the sawtooth voltage Va. The set voltage Va is inputted to one input terminal each of comparators 19a, 19b and 19c.

Output voltages $V_{x1}$, $V_{x2}$ and $V_{x3}$ from a speed drop rate setting circuit 20 are inputted to the other input terminal of the comparators 19a, 19b and 19c, respectively. The voltages $V_{x1}$, $V_{x2}$ and $V_{x3}$ are reference voltages which are to be compared with the voltage Va that increases as the running speed of the belt 3 drops from the set speed by predetermined amounts. The comparators 19a, 19b and 19c output speed-down signals $e_{d1}$, $e_{d2}$ and $e_{d3}$ when $V_a \geq V_{x1}$, $V_a \geq V_{x2}$, and $V_a \geq V_{x3}$, respectively.

If the belt speed drops by x percent, the interval of the signal e becomes $$\frac{100}{100-x}$$

times greater in inverse proportion to the belt speed, and the maximum value Vs of the voltage Va too increases at the same rate.

Assuming, therefore, that $Vx = Vs$ when $x = 0$, $$Vx = \frac{100}{100-x} Vs = (1+k)Vs$$

where $k = \frac{x}{100-x}$

As shown in FIG. 4, the speed drop rate setting circuit 20 has resistors $r_1$, $r_2$, $r_3$ and $r_4$ series-connected to a dc power supply E, and draws out reference voltages Vx1 and Vx2 from center taps Q and R, respectively. Resistivities of the resistors $r_1$ through $r_4$ are set so that (1) when the resistor $r_4$ is shortcircuited by a contact 20a the voltage at point Q becomes Vs, and (2) when the contact 20a is opened, for example, Vx1 becomes a reference voltage at an ordinary speed drop rate, such as 20 percent, requiring the stopping of the high-speed bucket belt conveyor 1 and Vx2 becomes a reference voltage at a minute speed drop rate, such as 1 percent, not requiring said stopping. Accordingly, reference voltage Vx for any speed drop rate is obtained by varying the resistivity of the resistor $r_1$ and so on. If variable resistors are used for the resistor $r_1$ etc., the speed drop rate can be set continuously.

Said setting of the speed drop rate x can be accomplished with predetermined accuracy irrespective of the steady speed.

In this invention, two variables, the normal speed and speed drop rate, are set to predetermined values as described above. To establish a set voltage Va, the belt 3 is rotated at a normal speed, a calibration switch 21a is closed, an auxiliary relay 21b and a relay 21c are actuated, a normally open contact 20a of the relay 21c is closed, and the resistor $r_4$ is short-circuited. Then, the resistance of the setting resistor 18 is gradually increased from the lowest level. This gradually increases the gradient and maximum value Vs of the voltage Va, so that the comparator 19a outputs the speed-down signal $e_{d1}$ which is applied to a logical operation circuit 22. When the logical operation circuit 22 generates a speed reduction signal $Q_4$, as described later, and a calibration pilot lamp 27a, energized by an output circuit 27, lights up, then the resistance of the resistor 18 is fixed.

As will be evident, this invention sets both the gradient of the sawtooth voltage Va representing the normal speed and the reference voltage Vx corresponding to the speed drop rate. As opposed to this, the conventional method has comprised either (1) setting the reference voltage Vs while fixing the Va gradient, or (2) setting the Va gradient while fixing the reference voltage Vx. However, it becomes increasingly difficult for such conventional methods to detect a few percent speed drop of the high-speed bucket belt conveyor 1 from the normal speed as the range of the normal speed increases.

Let's consider, for example, the adjustment of the Vx (assumed here as 5 volts) to make up for a 1 percent speed reduction in the high-speed bucket belt conveyor running at a rate of 1000 buckets/minute and 100 buckets/minute, respectively, by the aforementioned conventional method (1). In the case of 100 buckets/minute, Vx must be adjusted by (5/99) volt as expressed below.

$$\left\{ \frac{1}{100 \times \left(1 - \frac{1}{100}\right)} - \frac{1}{100} \right\} \times 5 \div \frac{1}{100} = \frac{5}{99}$$

Similarly, a Vx adjustment of (5/990) volt is necessary in the case of 1000 buckets/minute. But such fine adjustments are practically impossible. The same is true of the method (2).

But this invention can achieve such fine adjustment easily by setting the normal speed Va of a high-speed bucket belt conveyor and reference voltages Vx1, Vx2, Vx3 and so on corresponding to various speed drop rates, and, for example, short-circuiting the resistor $r_4$ and switching the voltage at point Q to Va and Vx1 as described before.

When the speed down signal $e_{d1}$ is produced, a stop control output circuit 24 may be actuated thereby to stop the belt 3. But it should be noted that the signal $e_{d1}$ arises not only when the belt speed drops, but also where the bucket pitch slightly increases at a joint in the belt 3. Therefore, provision must be made so that the belt is not stopped in the latter case. Accordingly, the signal $e_{d1}$ is inputted in the logical operation circuit 22 so that the high-speed bucket belt conveyor 1 is not stopped until the signal $e_{d1}$ is generated two or three times in succession.

The logical operation circuit 22 comprises D flipflop integrated circuits IC1 to IC4, each of which has a logical function such that, when a clock pulse enters its clock input terminal C, its terminal Q attains a level H (e.g. high or logic "1") under an input condition that its terminal D is at the level H, and its terminal Q instead attains a level L (e.g. low or logic "0") under an input condition that its terminal D is at the level L. A one-shot signal e is inputted in the terminal C of the IC1, while the speed down signal $e_{d1}$ is inputted in reset terminals R of the IC1 and IC2 and the terminal C of the IC3. Reset terminals R of the IC3 and IC4 are connected to the terminal Q of the IC2, and setting terminals S of the IC1, IC2 and IC3 are grounded to maintain the level L. Meanwhile, a setting terminal S of the IC4 is inputted with the speed down signal $e_{d4}$ that arises when the bucket pitch becomes greater than the one at the joint in the belt 3 or an alarm signal described later is produced in succession within a given period of time.

The following describes the function of the logical operation circuit 22 by reference to FIG. 5.

As understood from the above-described connection, the IC1, IC2 pair and IC3, IC4 pair constitute a first quarter divider 23a for the signal e and a second quarter divider 23b for the signal $e_{d1}$, respectively.

When the high-speed bucket belt conveyor 1 runs at a normal speed (FIG. 5a), the $\overline{Q}$ output $\overline{Q}_1$ of the IC1 inverts every time the signal e is inputted, thereby bringing the Q output $Q_2$ of the IC2 to the level H and resetting IC3 and IC4. Since the signal $e_{d1}$ is not created, IC3 and IC4 remain reset, with the $\overline{Q}$ output $\overline{Q}_3$ of the IC3 remaining at the level H and the Q output $Q_4$ of the IC4 at the level L.

When the high-speed bucket belt conveyor 1 slows down 20 percent or more from the normal speed, the signal $e_{d1}$ arises. If, for example, the signal $e_{d1}$ is inputted twice in succession while the IC2 is reset (FIG. 5b), the IC3 inverts twice to set the IC4 and bringing the Q output $Q_4$ thereof to the level H. When the signal $e_{d1}$ is inputted three times in succession while the IC2 is set (FIG. 5c), the first signal $e_{d1}$ resets IC1 and IC2, then the following two signals $e_{d1}$ set the IC4 to bring the Q output $Q_4$ to the level H. When the output $Q_4$ attains the level H, the output circuit 24 produces an output signal $E_d$ which actuates a relay 25 to stop the high-speed bucket belt conveyor 1.

Thus, the signal $E_d$ is not outputted when the signal $e_{d1}$ is inputted only once, but is outputted when the signal $e_{d1}$ is inputted twice or three times in succession. Accordingly, the high-speed bucket belt conveyor 1 does not stop even when a large bucket pitch at a joint in the belt 3 creates the signal $e_{d1}$ once.

When the high-speed bucket belt conveyor 1 slows down 1 percent or more from the normal speed, the comparator 19b outputs the signal $e_{d2}$, which actuates an alarm output circuit 26 and lights up an alarm light 26a. The signal $e_{d2}$ is inputted also in a timer 28, so that the output of the timer 28 is converted into a signal $e_{d4}$ through an OR circuit 29 when the signal $e_{d2}$ continues beyond a time set by the timer. Inputted in the terminal S, the signal $e_{d4}$ forcibly sets the IC4, thereby stopping the high-speed bucket belt conveyor. Item 28a is a time setting variable resistor of the timer.

When the bucket detecting interval (i.e., the interval at which the signal e is produced) becomes much longer than normal, waiting for the production of two or three signals $e_{d1}$ in succession may delay the creation of the signal $E_d$, thus making it impossible to prevent an accident. Therefore, when the bucket detecting interval is longer than the interval at the belt joint and shorter than twice the normal interval (FIG. 5d)—usually, it does not become twice or longer, in which case a bucket can be installed in between—a reference voltage Vx3 corresponding to a low speed responsible for such long interval is derived from the terminal S of the speed drop rate setting circuit 20. The output $e_{d3}$ from the comparator 19c, which is obtained when Va≧Vx3, is inputted in the OR circuit 29. The resultant output signal $e_{d4}$ is applied to the terminal S of the IC4 for forced setting, thereby stopping the high-speed bucket belt conveyor 1. The belt conveyor 1 can be stopped similarly when the running speed thereof drops sharply for some reason, or a bucket 4 falls off the belt 3 to leave an extra space thereon.

The output circuit 24 is connected to an OR circuit 30 which serves as an inhibit circuit. When a timer signal T, which is generated for a given time necessary for starting the high-speed bucket belt conveyor 1, or a signal A, which is outputted from a relay 21c while the set voltage Va is calibrated, is inputted in the OR circuit 30, the output circuit 24 stops outputting. The output circuit 26 also stops outputting when the signal T is inputted therein.

Constructed as described above, the speed drop detector according to this invention detects the passage of a bucket accurately, free of errors owing to the swing of the belt. This invention can accurately set, both individually and interrelatedly, and detect a sawtooth voltage, which determines the actual speed of the high-speed bucket belt conveyor, and a speed drop rate. Even when the bucket pitch is larger at a belt joint than elsewhere, this invention can accurately detect a speed drop, eliminating the effect of the increased interval. Furthermore, this invention permits implementing several counter-speed drop measures simultaneously when minor speed drop occurs, an emergency stop is needed, or otherwise. Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A speed drop detector for a high-speed bucket belt conveyor constructed of a series of buckets attached to an endless moving belt at regular intervals, which detector comprises: an electromagnetic induction sensor for detecting the passage of a bucket, a speed setter for generating a sawtooth voltage which rises with an adjustable gradient and falls sharply upon receipt of a signal from said sensor, a speed drop rate setting circuit for generating a reference voltage that is individually drawn in accordance with one or more set speed drop rates and is increased with respect to the maximum value of said sawtooth voltage at a working speed of the high-speed bucket belt conveyor, said increase being in inverse proportion to a speed corresponding to the set speed drop rate, a comparator for comparing the sawtooth and reference voltages and producing a speed-down signal when the sawtooth voltage reaches the reference voltage, an alarm output circuit actuated by a speed-down signal for a minute speed drop rate which requires no stoppage of the high-speed bucket belt conveyor, and a logic circuit for actuating a stop control output circuit by inputting a speed-down signal for an ordinary speed drop rate which does require the stoppage of the conveyor, the logic circuit having a first and a second quarter divider respectively dividing the sensor and speed-down signals, the first quarter divider being reset by the speed-down signal, and the second quarter divider being reset by a set output of the first quarter divider, the second quarter divider having a forced set terminal, and actuating the stop control output circuit with a set output thereof.

2. A speed drop detector for a high-speed bucket belt conveyor according to claim 1 in which an input to the forced set terminal is a signal that arises when the speed-down signal for the minute speed drop rate occurs continuously for a given time or a speed-down signal for a speed drop rate requiring an emergency stop of the high-speed bucket belt conveyor occurs.

* * * * *